US012640819B2

(12) United States Patent
Zbinden et al.

(10) Patent No.: US 12,640,819 B2
(45) Date of Patent: May 26, 2026

(54) APPARATUS AND METHOD FOR SECURE SPACE COMMUNICATION

(71) Applicants: UNIVERSITÉ DE GENÈVE, Geneva (CH); UNIVERSITAT AUTONOMA DE BARCELONA, Barcelona (ES)

(72) Inventors: Hugo Zbinden, Genèva (CH); Angeles Vazquez Castro, Barcelona (ES)

(73) Assignees: UNIVERSITE DE GENEVE, Geneva (CH); UNIVERSITAT AUONOMA DE BARCELONA, Barcelona (ES)

( * ) Notice: Subject to any disclaimer, the term of this patent is extended or adjusted under 35 U.S.C. 154(b) by 417 days.

(21) Appl. No.: 18/253,689

(22) PCT Filed: Nov. 17, 2021

(86) PCT No.: PCT/EP2021/081955
§ 371 (c)(1),
(2) Date: May 19, 2023

(87) PCT Pub. No.: WO2022/117341
PCT Pub. Date: Jun. 9, 2022

(65) Prior Publication Data
US 2024/0007196 A1 Jan. 4, 2024

(30) Foreign Application Priority Data
Dec. 1, 2020 (EP) ..................................... 20211124

(51) Int. Cl.
*H04B 10/70* (2013.01)
*H04B 10/112* (2013.01)
(52) U.S. Cl.
CPC ......... *H04B 10/70* (2013.01); *H04B 10/1121* (2013.01)
(58) Field of Classification Search
None
See application file for complete search history.

(56) References Cited

U.S. PATENT DOCUMENTS 8,891,767 B2 * 11/2014 Zubairy ................ H04L 9/0852
380/256
10,333,618 B2 * 6/2019 Djordjevic ............ H04L 1/0057
(Continued)

FOREIGN PATENT DOCUMENTS

CN 109525327 A 3/2019

OTHER PUBLICATIONS

Pan et al., Experimental free-space quantum secure direct communication and its security analysis, Aug. 2020 (Year: 2020).*
(Continued)

*Primary Examiner* — Jai M Lee
(74) *Attorney, Agent, or Firm* — Weston R. Gould; Dinsmore & Shohl, LLP

(57) ABSTRACT

Free-Space quantum keyless private communication method according to a communication protocol comprising exchanging information between an emitter (100) and a receiver (200) through a main quantum-classical channel and with an eavesdropper tapping said main channel through a wiretap channel, based on the wiretap channel model, wherein the overall degradation of the wiretap channel is superior than that of the main channel, comprising the steps of preparing, at the emitter (100), a message M composed of classical bits, coding said message M so as to transform it into a coded message X, practical modulating the amplitude and/or the phase of the optical pulses of the coded classical bits, sending the encoded message to the receiver (200) through a classical-quantum channel (500), such that an eavesdropper (300) tapping said channel is provided with partial information about the said states only, detecting and decoding the received message through quantum security analysis.

16 Claims, 4 Drawing Sheets

(56) References Cited

U.S. PATENT DOCUMENTS

| | | | | |
|---|---|---|---|---|
| 10,389,526 B2 * | 8/2019 | Zhang | .................... | H04B 10/11 |
| 10,999,069 B2 * | 5/2021 | Legré | .................... | H04B 10/70 |
| 11,411,723 B2 * | 8/2022 | Legré | .................... | H04L 9/0858 |
| 11,695,551 B2 * | 7/2023 | Lukens | ................. | H04L 9/0858 |
| | | | | 380/256 |
| 2024/0007196 A1 * | 1/2024 | Zbinden | ................. | H04B 10/70 |

OTHER PUBLICATIONS

Wyner, A. D., The Wire-Tap Channel, 1975 (Year: 1975).*
Jeewandara, Thamarasee, Implementing a practical quantum secure direct communication system, 2019 (Year: 2019).*
Pan, Dong, et al., "Experimental free-space quantum secure direct communication and its security analysis", Photonics Research, vol. 8(9); Sep. 2020.
Qi, Rouyang, et al., "Implementation and security analysis of practical quantum secure direct communication", Light: Science & Applications, 2019: 8:22, DOI: 10.1038/s41377-019-0132-3.

* cited by examiner

APPARATUS AND METHOD FOR SECURE SPACE COMMUNICATION

CROSS REFERENCE TO RELATED APPLICATIONS

This application is a U.S. national stage under 35 U.S.C. § 371 of PCT/EP2021/081955 filed Nov. 17, 2021, which claims priority to European application number 20211124.1 filed Dec. 1, 2020, the contents of which are hereby incorporated by reference in its entirety.

TECHNICAL FIELD

The present invention relates to secure space communication and more particularly to an apparatus and a method providing secure communication between satellites and earth stations.

BACKGROUND ART

Free-Space Optical communication (FSO) is an optical communication technology that uses light propagating in free space to wirelessly transmit data for telecommunications or computer networking. "Free space" means air, outer space, vacuum, or something similar, where the light propagates in a straight line. This contrasts with guided optics, such as optical fibers or more generally optical waveguides, where light is guided and directed by the waveguide. Free-space technology is useful where the physical connections are impractical due to high costs or other considerations.

Like any other type of communications, free-space optical communications require security to prevent eavesdropping. When one looks into the different security means of Free-Space Optical communications, one can see that several solutions have been investigated in order to provide a solution enabling an emitter and a receiver to share secret information through FSO.

Currently, there are several initiatives to deploy a network through space links. In particular, there is an increasing and unprecedented interest in space telecommunication networks.

During last decades, solutions have been developed in order to overcome eavesdropping according to different scenarios. Usually, in FSO communication, two eavesdropping scenarios can be considered. Both are illustrated in FIG. 1a.

In the first scenario, the eavesdropper Eve1 300 is located on the optical path between the emitter 100 and the receiver 200; therefore Eve1 300 can intercept the optical signal and resend a potentially modified optical signal to the receiver 200. This will be referred to as the active scenario which can be tackled by a QKD communication protocol, for example. In the second scenario Eve2 305 is not located on the optical path between the emitter 100 and the receiver 200 and is therefore limited to the ability of extracting a fraction of the optical signal transmitted from the emitter 100 to the receiver 200. In this scenario, the eavesdropper (Eve2 305) cannot resend any optical signal to the receiver 200. This will be referred to as the passive scenario which will be discussed later.

The first scenario can be resolved by the application of QKD in Free-space communications. QKD is a protocol that allows the exchange of secret keys in an active scenario, when the eavesdropper is located on the optical path between the emitter and the receiver. In a QKD protocol, the communication channel between the two users is known as a quantum channel A quantum channel is a communication channel, which transmits quantum particles, typically photons, in a way that conserves their quantum characteristics. There are two sets of parameters, which are used for quantum encoding. One is the polarization of the photons, and the second is the phase, which requires the use of interferometers. Both have their advantages and drawbacks depending on the physical layer of the quantum channel and the type of QKD protocol.

The basic idea behind QKD is that the eavesdropper is allowed to intercept the signal and process it in any way compatible with quantum mechanics Nevertheless, the legal users, known as Emitter and Receiver, can still exchange a secure key.

There are several protocols for QKD such as BB84 protocol, E91, B92, and COW but they are conventional ones and well known in the art and will not be repeated here.

All these protocols are based on the transmission of single photons through the quantum channel, and are known as Discrete Variable QKD or DV-QKD. They require the use of single-photon detectors on Receiver's side. In order to alleviate this need, another type of QKD, named Continuous Variable QKD, or CV-QKD have been suggested and demonstrated. CV-QKD is typically used with the phase parameters.

Commercial systems for ground QKD, distributed over an optical fiber, have been developed. In all practical implementations of ground QKD, the parameter used for quantum encoding is the phase, or a related timing parameter for the COW protocol. The reason is that, as polarization is not conserved in an optical fiber, polarization schemes require complicated and expensive components. On the other hand, interferometric detection is easier to realize in single-mode optical fibers, which is the medium of choice for ground QKD.

One of the most restrictive limitations of ground QKD is the distance limitation. Due to unavoidable loss in the optical waveguide and the fact that optical amplifiers cannot be used in a quantum channel, the distance between Emitter and Receiver is limited to about hundred kilometers in a commercial setup and up to three hundred kilometers in an academic experiment. Therefore, in order to increase the distance range, FSO QKD, where the quantum channel is free space, which does not have the same loss limitation, has been suggested.

Recently, FSO QKD has been investigated in order to securely exchange a key between an emitter and a receiver in free space, typically between a satellite or a flying drone and a ground-based station.

Document EP 3 337 063 describes a conventional free-Space key distribution method comprising exchanging information between an emitter and a receiver based on the physical layer wiretap channel model. This system is a QKD communication system consisting is exchanging keys between an emitter and a receiver, it follows a QKD protocol-based communication model: quantum part and iterative classical (post-processing) part, where the information is modulated as qbits and where the system operation uses measured QBER as input of the security provision process. However, a drawback of the invention is that, although it allows stronger signals, the force of the signal is still weak, it requires a post-treatment of the key, sifting and distillation, and it requires a two-way communication protocol.

However, QKD with satellites is extremely challenging due to the small signal strength of the order of one photons per pulse, the high channel loss and the sensitivity to background noise, which does not allow key exchanges during daytime. On the other hand, eavesdropping without being noticed seems to be very complicated as well in a free-space scenario.

Moreover, QKD requires a two-way protocol between the emitter and the receiver and is therefore generating less reliability than a one-way protocol, indeed a two-way protocol over satellite requires long time to distil useful keys due to the propagation times, which for one hop can range from a few dozens to hundreds of milliseconds. Therefore this delay adds up during each iteration of a QKD protocol.

Regarding the second scenario, the conventional communication channel is known as a wiretap channel, first introduced by Wyner. However, the concept of a wiretap channel was later extended, at a more abstract level by Czisar and Korner. In their case, the wiretap channel is an abstract model, which includes any tripartite channel (with an Emitter, a Receiver and an Eavesdropper), with no restriction on the eavesdropper. In this abstract model, the wiretap channel comprises two separate channels, one between Emitter and Receiver, and one between Emitter and Eve see FIG. 1b.

However, this technique requires assumptions on Eve noise level and signal extraction capability. For this reason, the noise on Eve's detector has to be lower bounded, and the bound has to be known. This is quite problematic because, one can never be sure of what quality of detectors Eve2 is provided with. In fact, in general, in order to consider the best eavesdropping capacity and therefore provide the best security, one considers that Eve is a passive eavesdropper which is not located on the optical path between the emitter 100 and the receiver 200 and is limited by the laws of quantum electrodynamics due to the fact that one assumes she does not need to make a physical measurement but is given all information which is principle available at the spatial location where she is and is therefore limited by her position only.

There is therefore an urgent need for a system and a method, which provides secure FSO communications under the assumption that Eve is not located on the optical path between the emitter 100 and the receiver and is only limited by the laws of quantum physics.

It is therefore an object of the invention to provide system and a method which provides secure FSO communications which overcome the above mentioned drawbacks and provide a secure and simple FSO communication.

SUMMARY OF THE INVENTION

This object is achieved by combining the physical layer wiretap channel hypothesis (the eavesdropper is limited to listening) and the use of a simple quantum channel, which will limit the amount of information available to Eve, through the principles of quantum mechanics and quantum electrodynamics.

A first aspect of the invention relates to a free-Space quantum keyless private communication method according to a communication protocol comprising exchanging information between an emitter (100) and a receiver (200) through a main-classical-quantum channel and with an eavesdropper tapping said main channel through a wiretap channel, based on the wiretap channel model, wherein the overall degradation of the wiretap channel is superior than that of the main channel, comprising the steps of preparing, at the emitter (100), a message M composed of classical bits, coding said message M so as to transform it into a coded message X, converting the classical bits of the coded message into a signal to be sent to Bob by modulating the amplitude and/or the phase of the coherent states, sending the signal comprising the encoded message to the receiver (200) through a quantum-classical channel (500), such that an eavesdropper (300) tapping said channel is provided with partial information about the said states only, detecting and decoding the received message Preferably, the transformation step is a stochastic coding step.

Advantageously, the communication protocol is a one-way communication protocol.

In a preferred manner, the classical bits modulate a coherent state which is modeled with quantum electrodynamics.

According to a preferred embodiment, the method further comprises a degradation parameter $\gamma$ calculation step depending on the receiver's parameter, such that $$\gamma(d_B, d_E, \eta_b, \theta_E, \theta_{div}) = \frac{1}{\eta_b}\left(\frac{d_B}{d_E}\right)^2\left(\frac{D_R^E}{D_R^B}\right)^2 e^{-2\left(\frac{2\theta_E}{\theta_{div}}\right)^2}$$

where $d_B$ is the distance between the emitter and the receiver, $d_E$ is the distance between the emitter and the eavesdropper, $D^E{}_R$ is the diameter of the antenna of the eavesdropper $D^B{}_R$ is the diameter of the antenna of the receiver, $\eta_B$ is the (additional) loss of the receiver such as atmospheric, pointing, optic circuits, and detector efficiency, $\theta_{div}$ is the far field divergence, and $\theta_E$ is Eve's angle to the satellite According to a preferred embodiment, the free-Space key distribution method further comprises defining an exclusion surrounding the receiver (200) based on the degradation parameter $\gamma$.

Advantageously, the exclusion surrounding the receiver (200) is defined such that the degradation parameter $\gamma$ is lower than a given value smaller than 1.

Preferably, the exclusion surrounding the receiver (200) is defined such that the degradation parameter $\gamma$ is lower than 0.1.

Advantageously, the signal is an optical signal.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1A:
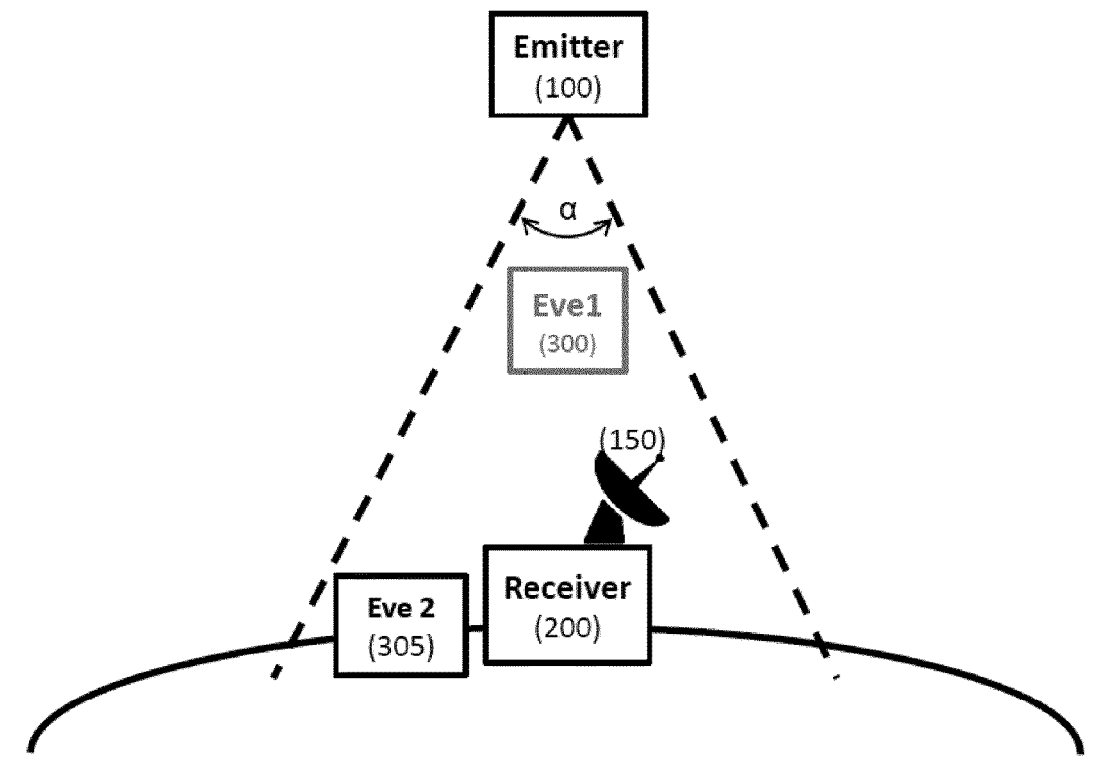
FIG. 1a represents the different eavesdropping scenarios, with wiretap channel and physical layer wiretap channel eavesdropping.
Figure 1B:
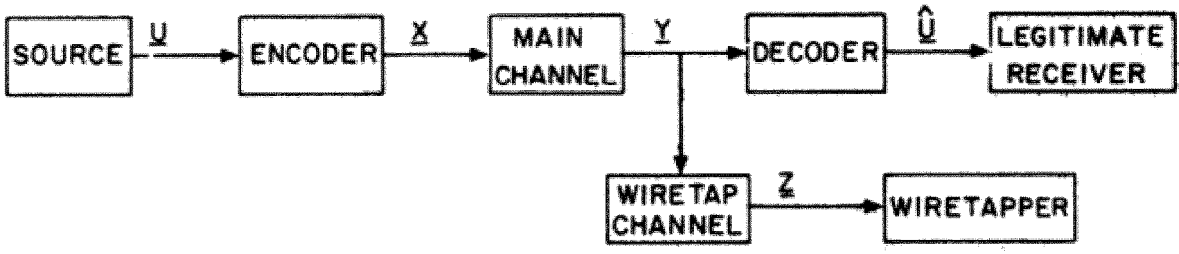
FIG. 1b represents the wiretap channel principle of the prior art.
Figure 1C:
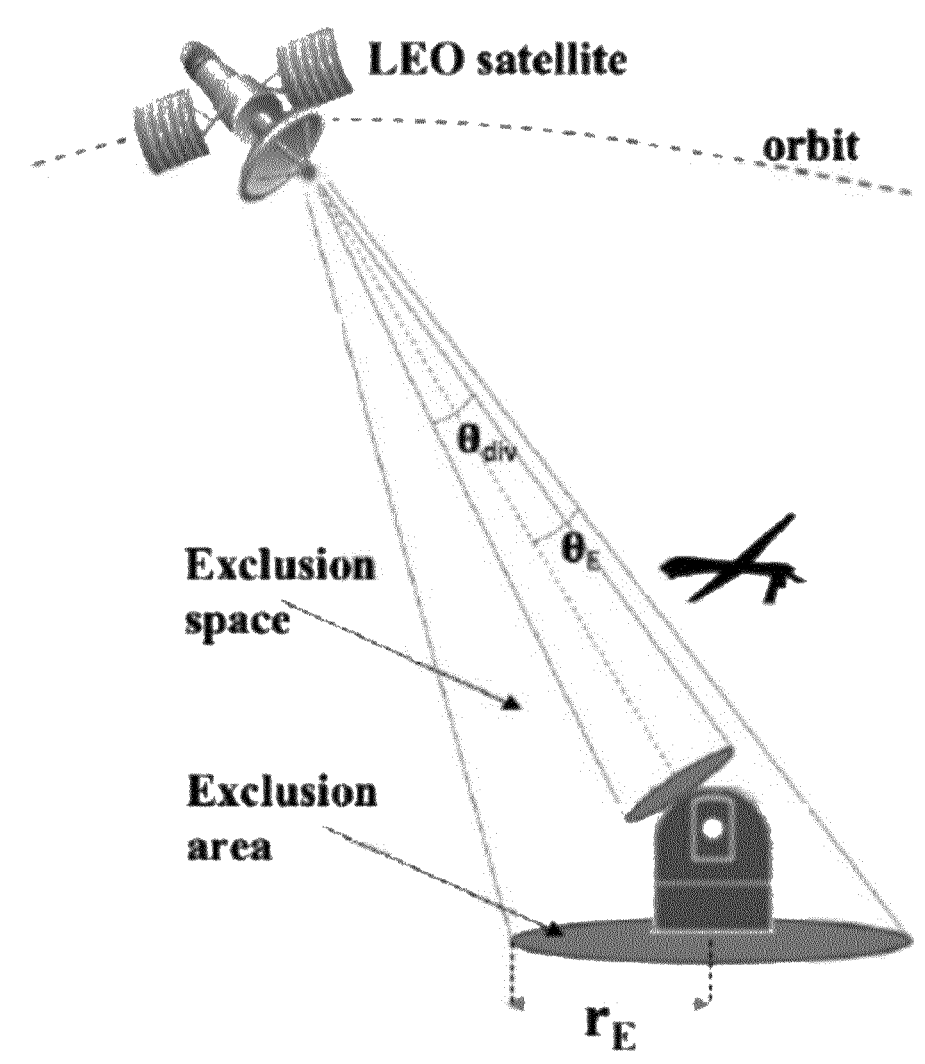
FIG. 1c represents the passive scenario.

FIG. 1, as mentioned and described above, presents various eavesdropping scenarios. An emitter 100 and a receiver 200 exchange data through a FSO communication channel, defined by the dashed lines, wherein an eavesdropper Eve1 300 may be located between 100 and 200, and intercepts and resend the beam, according to the wiretap channel scenario, or an eavesdropper Eve2 305 may be located on the ground and can only collect part of beam without resending it, according to the physical layer wiretap channel scenario, both attempting at gaining information on the exchanged data. Its description will not be repeated here in detail.

FIG. 1b represents the general principle of wiretap channel. It was introduced by Wyner (relaxing the conditions for Shannon's perfect secrecy) and generalized by Csiszar & Körner. It models a general communication system architecture with a transmitter that encodes messages M into codewords X of n symbols for transmission to a receiver, in the presence of an eavesdropper that obtains noisy observations Z of X. The literature proved the existence of coding schemes simultaneously ensuring reliable transmission and secrecy for discrete memoryless channels, which was extended to Gaussian channels and wireless channels. As a further evolution of the wiretap channel concept, it was noticed that secrecy is closely related to the concept of channel resolvability from information-spectrum methods developed by Han and Verdú. This approach was pioneered by M. Hayashi and provides a completely different way to analyze the system and construct the codes to provide strong security. In the case of more powerful Eve, one usually considered a different architecture including a public channel where the objective is to distill secret keys. However, this needs 2-way communication.

Figure 2:
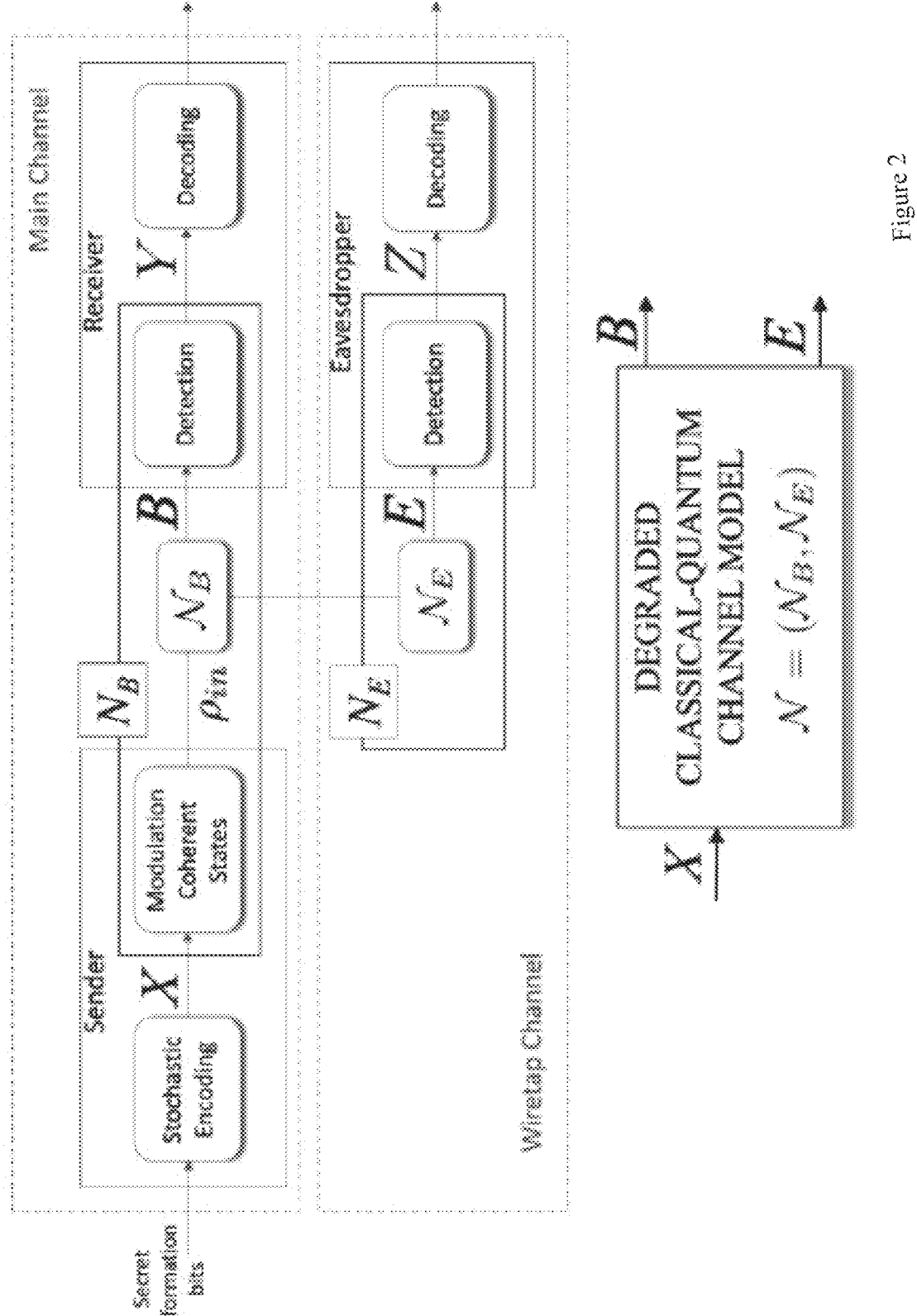
FIG. 2 represents the general principle of the invention.

FIG. 2 represents, on top, the general principle of the invention, i.e. the main channel and the wiretap channel and on the bottom, the information theoretical representation of the classical-quantum degraded wiretap channel. It shows classical input random variable X and output quantum systems B and E.

More particularly, it represents the general direct communication protocol as a one-way wiretap protocol where secret bits are channel encoded and sent over n uses of the optical channel. The protocol contains the following steps is the codeword received by Bob, i.e. it is a noisy version of the transmitted codeword Xn 1) The transmitter sends a stream of secret information bits, e.g. video, voice, etc., to an encoder, a preferably stochastic wiretap encoder. Practically, the transmitter generates a message, then encodes this message. This encoding step comprises the transmitter selecting a codeword $X^n$ to send the secret message M with probability $q_x$, and sends it to Bob who receives $Y^n$ which is the codeword received by Bob, i.e. it is a noisy version of the transmitted codeword $X_n$, but the channel also leaks information to the environment represented by the eavesdropper (Eve), who receives $Z^n$.

The secrecy of the message depends on the structure of this encoder, which is characterized by the rate R=k/n (where k is the number of secret bits), the error probability after decoding, $\in_n$, and a security measure, $\delta_n$.

2) For each use of the channel, therefore, once coded and before sending, the transmitter prepares a coherent state modulation by the random variable $X \in X=\{0, 1\}$, where X=0 with probability q and X=1 with probability 1−q. The OOK states transmitted by Alice are the vacuum state, $|\alpha_0\rangle=|0\rangle$, and $$|\alpha_1\rangle = e^{-\frac{1}{2}|\alpha|^2} \sum_{n=0}^{\infty} \frac{\alpha^n}{(n!)^{1/2}} |n\rangle$$

in other words the encoded secret bits are sent to a discrete modulator, which modulates the amplitude (and/or the phase) of the transmitted optical pulses. Here, we assume discrete amplitude modulation of coherent states.

3) After n transmissions over the quantized propagating field, the receiver receives $B_n$ and the eavesdropper receives $E_n$. The receiver estimates his received coherent state after measuring the arriving light and obtains $Y_n$. He disposes of state-of-the-art detectors. Eve may apply the best quantum detection strategy to obtain $Z_n$. The receiver (Bob) received the coded message and decodes it after measuring the arriving light.

According to the wiretap theory of the present invention, even when the eavesdropper is computationally unbounded, the wiretap code of the present invention ensures that if R is an achievable rate, both $\varepsilon_n$ and $\delta_n$ tend to zero for large n, where $\varepsilon_n$ is the error probability and $\delta_n$ is a security measure such that:

$$\lim_{n\to\infty} \epsilon_n = \lim_{n\to\infty} \delta_n = 0,$$

which means that the error probability $\varepsilon_n$ and the information leakage towards the eavesdropper can be made arbitrarily low. Upper bounds are also known for the speed of convergence rate of leaked information. Hence, the protocol jointly provides information-theoretical reliable and secure communication. The supremum of all such rates is called the private capacity.

In other words, the private capacity (or secrecy capacity) of the classical-quantum wiretap channel of the present invention, is the performance metric of the present protocol.

More particularly, the meaning of strong security is that, given a uniform distribution of the message to be transmitted through the channel between an emitter and a receiver, an eavesdropper shall obtain no information about it. This criterion is the most common security criterion in classical and quantum information theory.

The metric of strong security is the amount of mutual information leaked to Eve using, that can be represented by $\delta_n=I(X; Z)$.

When the communication channel between the emitter and the receiver is degradable, it is possible to assume symbol-wise detection and decoding for the channel N=($N_B$, $N_E$). The probabilistic description of the degradability property for the classical channel is that X, Y and Z form a Markov chain, X—Y—Z.

FIG. 2 shows the physical description of the protocol implemented with coherent states over a degradable channel according to the present invention.

The main channel between Alice (the emitter) and Bob (the receiver) and the wiretap channel between Alice (the emitter) and Eve (the eavesdropper) are preferably discrete memoryless channels. In this case, the private capacity of the quantum wiretap protocol (with quantum channel and information) is $$C_P(N) = \sup_{\rho_{in}} I_c(\rho_{in}, N),$$

where $\rho_{in}$ is the input density matrix and $I_c(\rho_{in}, N)$ is the coherent information defined as $$I_c(\rho_{in},N)=S(N_B(\rho_{in})-S(N_E(\rho_{in})),$$

with S being the von Neumann entropy.

Now we will describe the degradable channel of the practical (energy-constrained) protocol over space links, which is used to derive the private capacity.

First, we consider an alphabet consisting of two pure coherent states, modulated by the random variable $X \in X = \{0, 1\}$, where $X=1$ with probability q and $X=0$ with probability 1-q.

One assumes On OFF Keying (OOK), but the model could also be applied to e.g. Binary Phase Shift Keying (BPSK). The OOK states transmitted by Alice are the vacuum state, $|\alpha_0\rangle = |0\rangle$, and $$|\alpha_1\rangle = e^{-\frac{1}{2}|\alpha_1|^2} \sum_{n=0}^{\infty} \frac{\alpha_1^n}{(n!)^{1/2}} |n\rangle.$$

Also, one assumes a single-mode free-space quantum bosonic channel for the wiretap channel in the semi-classical regime. The efficiency of Bob's channel is n.

The coefficient $\gamma \in (0, 1)$ characterizes the channel power degradation, hence, the transmittance of Eve's channel is $\gamma \eta$.

The received states are simply the vacuum, or $|\sqrt{\eta}\alpha_1\rangle$ and $|\sqrt{\eta}\gamma\alpha_1\rangle$ for Bob and Eve respectively. The wiretap channel transition probabilities depend on the coherent states received by Bob and Eve and by their detection strategies. As mentioned above, for practical purposes, we assume that Bob uses standard single photon detectors, i.e. a threshold detector and one also takes into account limited detection efficiency (included in $\eta$) and noise (dark counts probability $p_{dark}$ and stray light with a Poisson photon number distribution and average $\eta_0\Delta$).

Figures 3, 4:
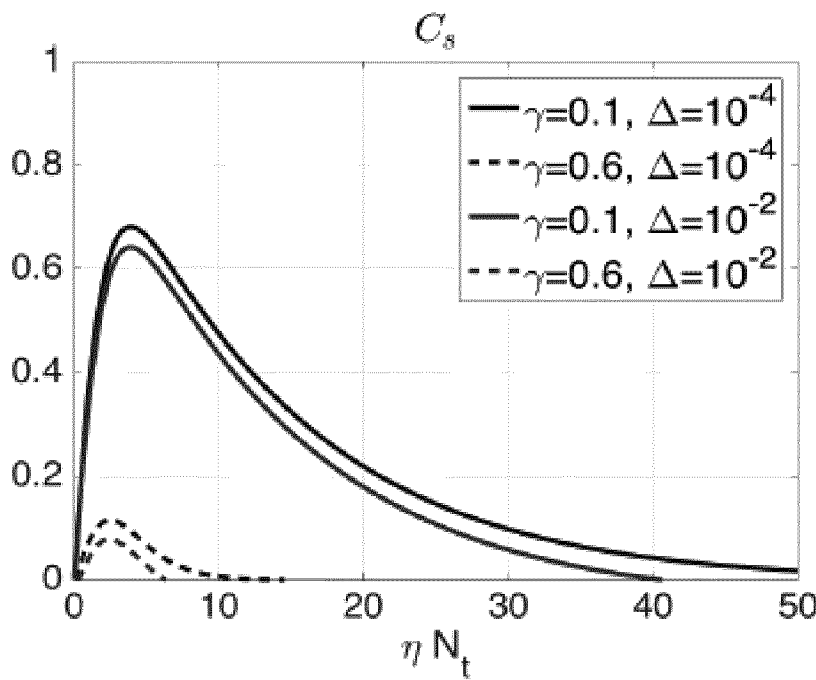
FIG. 3 represents probabilistic detection models for Bob and Eve.
FIG. 4 is a graph which represents numerical values of $Cp(\gamma)$ for OOK and sensitivity to noise assuming pdark≈0 and $\eta o$=1.

Therefore, the conditional probabilities that Bob detects y given that Alice sent x are illustrated in FIG. 3 with $\epsilon_0 = (1-p_{dark})e^{-\eta_o\Delta}$ and $\epsilon_1 = (1-p_{dark})e^{-(\eta/\alpha_1|2+\eta_o\Delta)}$.

On the other hand, since Eve is limited by its spatial position only, she instead performs an optimal quantum detection. For the single observation, this leads to the optimal error probability $\epsilon^*$, which is calculated as $$\epsilon^* = \min_{0 \leq \Pi \leq 1} [qTr(1-\Pi)\rho_1 + (1-q)Tr\Pi\rho_0]$$
$$= \frac{1}{2} - \frac{1}{2}\|q\rho_1 - (1-q)\rho_0\|_1,$$

where $\| \ \|_1$ stands for trace norm. In the binary source scenario, this bound is achieved by the Holevo-Helstrom projector, for which several practical implementations have been proposed such as the Kennedy receiver, the Dolinar receiver or the Sasaki-Hirota receiver.

The optimal error probability of Eve resulting from the above equation becomes $$\epsilon^*(\gamma) = (1-\sqrt{1-4q(1-q)e^{-\eta\gamma|\alpha_1|^2}})/2,$$

The private capacity for the wiretap channel model coincides with the classical secrecy capacity and is defined as $$C_P(\gamma) = \max_q \{I(X;Y) - I(X;Z \mid \gamma)\},$$

where I(X, Y) is the Shannon mutual information of Alice using a state-of-the-art photon counting detector and I(X; Z|$\gamma$) is the maximum Shannon mutual information that Eve can physically detect.

When the optimized capacity is uniform, i.e. q=½, we obtain.

$$C_P(\gamma) = \left[h(\epsilon^*(\gamma)) + h\left(\frac{\epsilon_0 + \epsilon_1}{2}\right) - \frac{h(\epsilon_1) + h(\epsilon_0)}{2} - 1\right]_+$$

where [ ]$_+$ means the positive part and the notation h( ) is the binary Shannon entropy.

FIG. 4 shows the numerical results of the above equation and we observe that the secrecy rate is as high as 0.68 for $\gamma=0.1$ with little sensitivity to noise. And even for adverse channel conditions ($\gamma$ close to 1) there is a positive secrecy rate for reasonable noise (e.g. up to $\gamma=0.9$ for $\Delta=10^{-4}$), however we will see in the example below that in practice is best to aim for $\Delta<0.1$.

Indeed, the method of the present invention also preferably comprises a degradation parameter $\gamma$ calculation step depending on the receiver's parameter. Indeed, in order to provide a communication channel between Alice and Bob which is less degraded than the channel between Alice and Eve, this degradation has to be mastered and fixed.

We can approximate the fraction of the light collected by Bob (receiver), the free space loss $\eta^B$, as the ratio of the telescope area and the footprint area with $$\eta_f^B = \frac{A_R}{A_F} = \frac{\pi(D_R/2)^2}{\pi(D_F/2)^2} = \frac{D_R^2}{\theta_{div}^2 d_B^2},$$

$$D_F \approx \theta_{div} d$$

where $d_B$ is the distance between transmitter and receiver, $D_R$ is the diameter of the telescope of Bob and DF is the diameter of the footprint area around Bob.

The number of photons detected by Bob can therefore be calculated by:

$$\eta N_t = \eta_f^B \eta_b N_t,$$

where $\eta_b$ represents additional losses depending on the experimental situation.

For Eve (the eavesdropper) we calculate $\eta^E$ (the fraction of the light collected by Eve) as above but one adds a factor taking into account the light intensity outside the exclusion angle supposing a Gaussian angular distribution of the beam as $$\eta_f^E = \frac{(D_R^E)^2}{\theta_{div}^2 d_E^2} e^{-2\left(\frac{2\theta_E}{\theta_{div}}\right)^2}.$$

Then, the number of photons detected by Eve becomes simply $\eta^E N_t = \gamma \eta N_t$, as we assume no additional loss for Eve. Hence, for fixed antenna sizes one can easily calculate $\gamma$ as $$\gamma(d_B, d_E, \eta_b, \theta_E, \theta_{div}) = \frac{1}{\eta_b}\left(\frac{d_B}{d_E}\right)^2 \left(\frac{D_R^E}{D_R^B}\right)^2 e^{-2\left(\frac{2\theta_E}{\theta_{div}}\right)^2}$$

And therefore γ, can easily be defined and tuned according to the parameters of the used devices.

EXAMPLE

As an example, we will now look into a realistic physical scenario, where we use as a reference the recent experiment of QKD with the Chinese LEO satellite Micius.

Considering an average number of noise photons, for different collection angles, filter bandwidths and temporal windows, $\Delta$ of $10^{-4}$ and $10^{-7}$ as an achievable value for clear daytime sky, and a full moon clear night, respectively. During a cloudy day, one could expect a $\Delta$ of $10^{-2}$, and still positive private rate if the transmission of the channel is not reduced too much.

Table I below presents the private capacity for LEO, MEO and GEO satellites and different ambient light conditions.

TABLE I

Comparison table between the achievable secret key rate for QKD and the achievable private rate for the wiretap channel presented in this work. For QKD with unrestricted Eve the values in the table are for an experiment carried out at night. In the case of a restricted Eve, daylight conditions are taken into account.

| | | | QKD, $\Delta = 10^{-7}$ (night) | | Restricted Eve, $\Delta = 10^{-4}$ (clear day) | | | |
| Configuration | Distance [km] | Channel loss ($\eta_f^B$) | Micius [4] | PLOB [35] | $r_E$ [m] | γ | QKD [23] | private rate (8) |
| --- | --- | --- | --- | --- | --- | --- | --- | --- |
| LEO | 500-1200 | 22 dB | <10 kb/s | 10 Mb/s | 12.5 | 0.1 | 360 Mb/s | 680 Mb/s |
| MEO | 10000 | 40 dB | — | 100 kb/s | 100 | 0.1 | 360 Mb/s | 680 Mb/s |
| GEO | 36000 | 52 dB | — | 6 kb/s | 340 | 0.1 | 360 Mb/s | 680 Mb/s |

Here, the satellite has an orbit of about 500 km above the earth surface and exchanges keys over distances up to 1200 km if the satellite is close to the horizon. The transmitter is equipped with 300 mm Cassegrain telescope featuring a far field divergence $\theta_{div}$ of 10 μrad (full angle at $1/e^2$). The receiver at ground station has a telescope with a diameter $D_R$ of 1 m.

In the Micius experiment those are atmospheric turbulence 3-8 dB ($\eta_{atm}$), pointing errors ($\eta_p$)<3 dB, overall optical loss ($\eta_o$) from telescope input lens to detector 7.4 dB detector, detector efficiency $\eta_{det}$ 50% (−3 dB). In the following we can reasonably consider an overall $\eta_b$ of 20 dB (1%).

For $d_B=d_E=1200$ km and $\theta_E=r_E/d$, for the Micius system parameters and assuming a very large eavesdropper's receiving antenna $D^E$ of 2 m and a small exclusion radius $r_E=12.5$ m we obtain:

$$\gamma=0.07<0.1$$

It is recommended to fix the exclusion radius such that γ<0.1 which is a good trade-off, even if any other value <1 is in principle possible. Indeed, this value is shown to be a good choice as it leads to high secret capacities >0.6, little sensitivity to noise and signal fluctuations for reasonable exclusion radii. This sensitivity is driven by the distinguishability of the coherent states at Eve's Holevo-Helstrom detector, the lower the γ the less sensitivity of the distinguishability to signal dynamics We will now compare the present invention with conventional QKD protocols In order to do so, the private capacity for different geometrical configuration, supposing that Alice and Bob have a satellite and a ground station equivalent to the Micius experiment need to be calculated.

Here, one considers OOK with a clock rate of 1 GHz. With a time window of 1 ns, state of the art single photon detectors, feature a $p_{dark}<10^{-7}$, so detector noise has no significant effect on the secret capacity.

Table I shows that the private capacity of a wiretap channel, outperforms QKD in terms of rate and most importantly in terms of resistance against noise. It has to be noted that the necessary laser power in order to reach the optimal signal strength of about 4 photons in average is moderate, e.g. about 15 mW and 15 μW, for the GEO and the LEO setting, respectively, and therefore it is no limitation.

The above shows that in FSO communication protection area is needed for any kind of secure communication and how to achieve it. The above describes a downlink communication, however, similarly, an uplink can be considered in the same manner as well and its channel degradation γ can be estimated for reasonable assumptions on Eve's satellites as well.

The protocol of the present invention is sensitive to jam attacks, so are QKD protocols. However, the protocol of the present invention can also be used in coordination with security mechanisms in communication layers above the physical layer to provide the satellite system availability, integrity and confidentiality.

Given these boundary conditions, the above demonstrates that physical layer encryption can provide information-theoretically secure communication also in the presence of Eve only limited by the laws of quantum physics. As for the wiretap codes, explicit constructions are available that can provide the strong security.

One of the main advantage is that the present invention provides achievable private rates which are considerably higher than the QKD rates for the practical systems. Moreover, direct secret communication is also possible close to illuminated cities and even during daytime in contrast to QKD. Moreover, given the low rates, the secret keys generated by QKD will in practice not be used in combination with the one-time-pad but with symmetric encryption systems like AES. This means that the legitimate users have to choose between trusting physical security including exclusion areas around Alice and Bob which is needed for QKD as well or the computational security of encryption algorithms.

The invention claimed is:

1. Free-Space quantum keyless private communication method according to a communication protocol comprising exchanging information between an emitter (100) and a receiver (200) through a main-classical-quantum channel and with an eavesdropper tapping said main-classical-quantum channel through a wiretap channel, based on the wiretap channel model, wherein an overall degradation of the wiretap channel is superior than that of the main channel, comprising the steps of > defining an exclusion radius $r_e$ surrounding the receiver (200) and computing a degradation parameter γ based on said exclusion radius $r_e$ wherein the degradation parameter γ permits that the overall degradation of the wiretap channel is superior to that of the main channel and a wiretap channel degrading step based on the degradation parameter,
>
> preparing, at the emitter (100), a message M composed of classical bits,
>
> coding said message M so as to transform it into a coded message X,
>
> converting the classical bits of the coded message into a signal to be sent to Bob by modulating an amplitude and/or a phase of coherent states,
>
> sending the signal comprising the coded message to the receiver (200) through a quantum-classical channel (500), such that an eavesdropper (300) tapping said channel is provided with partial information about the said states only, and
>
> detecting and decoding the received message.

2. Free-Space key distribution method according to claim 1, characterized in that said transformation step is a stochastic coding step.

3. Free-Space key distribution method according to claim 2, characterized in that the communication protocol is a one-way communication protocol.

4. Free-Space key distribution method according to claim 1, characterized in that the classical bits modulate a coherent state which is modeled with quantum electrodynamics.

5. Free-Space key distribution method according to claim 1, characterized in that the degradation parameter γ calculation step depends on the receiver's parameter, such that:

$$\gamma(d_B, d_E, \eta_b, \theta_E, \theta_{div}) = \frac{1}{\eta_b}\left(\frac{d_B}{d_E}\right)^2\left(\frac{D_R^E}{D_R^B}\right)^2 e^{-2\left(\frac{2\theta_E}{\theta_{div}}\right)^2}$$

> where $d_B$ is a distance between the emitter and the receiver, $d_E$ is the distance between the emitter and the eavesdropper, $D^E{}_R$ is a diameter of the of an antenna of the eavesdropper, $D^B{}_R$ is a diameter of an antenna of the receiver, $\eta_B$ is the (additional) loss of the receiver such as atmospheric, pointing, optic circuits, and detector efficiency, $\theta_{div}$ is a far field divergence, and $\theta_E$ is Eve's angle to a satellite where $\theta_E = r_E/d_E$.

6. Free-Space key distribution method according to claim 5, characterized in that exclusion surrounding the receiver (200) is defined such that the degradation parameter γ is lower than a given value smaller than 1.

7. Free-Space key distribution method according to claim 6, characterized in that the exclusion surrounding the receiver (200) is defined such that the degradation parameter γ is lower than 0.1.

8. Free-Space key distribution method according to claim 1, characterized in that the signal is an optical signal.

9. Free-Space quantum keyless private communication system comprising an emitter (100) and a receiver (200) adapted to exchange information through a main classical-quantum channel and with an eavesdropper tapping said main channel through a wiretap channel, based on the wiretap channel model, wherein the overall degradation of the wiretap channel is superior than that of the main channel, adapted to carry out the method of claim 1.

10. Free-Space quantum keyless private communication method according to a communication protocol comprising exchanging information between an emitter (100) and a receiver (200) through a main-classical-quantum channel and with an eavesdropper tapping said main-classical-quantum channel through a wiretap channel, based on the wiretap channel model, wherein an overall degradation of the wiretap channel is superior than that of the main channel, comprising the steps of:

> calculating a degradation parameter γ depending on a receiver's parameter, such that $$\gamma(d_B, d_E, \eta_b, \theta_E, \theta_{div}) = \frac{1}{\eta_b}\left(\frac{d_B}{d_E}\right)^2\left(\frac{D_R^E}{D_R^B}\right)^2 e^{-2\left(\frac{2\theta_E}{\theta_{div}}\right)^2}$$

> where $d_B$ is a distance between the emitter and the receiver, $d_E$ is the Distance Between the emitter and the eavesdropper, $D^E{}_R$ is a diameter of the of an antenna of the eavesdropper, $D^B{}_R$ is a diameter of the antenna of the receiver, $\eta_B$ is a (additional) loss of the receiver, $\theta_{div}$ is a far field divergence, and $\theta_E$ is Eve's angle to a satellite;
>
> defining an exclusion surrounding the receiver (200) based on the degradation parameter γ;
>
> preparing, at the emitter (100), a message M composed of classical bits;
>
> coding said message M so as to transform it into a coded message X;
>
> converting the classical bits of the coded message into a signal to be sent to Bob by modulating an amplitude and/or a phase of the coherent states;
>
> sending the signal comprising the encoded message to the receiver (200) through a quantum-classical channel (500), such that an eavesdropper (300) tapping said channel is provided with partial information about the said states only; and
>
> detecting and decoding the received message.

11. Free-Space key distribution method according to claim 10, characterized in that said converting step is by stochastic coding.

12. Free-Space key distribution method according to claim 11, characterized in that the communication protocol is a one-way communication protocol.

13. Free-Space key distribution method according to claim 10, characterized in that the classical bits modulate a coherent state which is modeled with quantum electrodynamics.

14. Free-Space key distribution method according to claim 13, characterized in that exclusion surrounding the receiver (200) is defined such that the degradation parameter γ is lower than a given value smaller than 1.

15. Free-Space key distribution method according to claim 14, characterized in that the exclusion surrounding the receiver (200) is defined such that the degradation parameter γ is lower than 0.1.

16. Free-Space key distribution method according to claim 10, characterized in that the signal is an optical signal.

\* \* \* \* \*